(No Model.)

G. GLASS.
SLAB INDICATOR OR GAGE FOR SAWMILL CARRIAGES.

No. 594,003. Patented Nov. 23, 1897.

Witnesses:
J. S. Bowen
J. A. Willson

Inventor:
George Glass,
by H. B. Willson & Co.
Attorneys

UNITED STATES PATENT OFFICE.

GEORGE GLASS, OF PORT HURON, MICHIGAN.

SLAB INDICATOR OR GAGE FOR SAWMILL-CARRIAGES.

SPECIFICATION forming part of Letters Patent No. 594,003, dated November 23, 1897.

Application filed July 28, 1897. Serial No. 646,245. (No model.)

*To all whom it may concern:*

Be it known that I, GEORGE GLASS, a citizen of the United States, residing at Port Huron, in the county of St. Clair and State of Michigan, have invented certain new and useful Improvements in Slab Indicators or Gages for Sawmill-Carriages; and I do declare the following to be a full, clear, and exact description of the invention, such as will enable others skilled in the art to which it appertains to make and use the same.

My invention relates to a slab gage or indicator for sawmill-carriages; and the object is to provide a simple, convenient, and effective device for gaging the slab to be cut from the log.

To this end the invention consists in the construction, combination, and arrangement of the device, as will be hereinafter more fully described, and particularly pointed out in the claim.

In the accompanying drawings the same reference-characters indicate the same parts of the invention.

Figure 1:
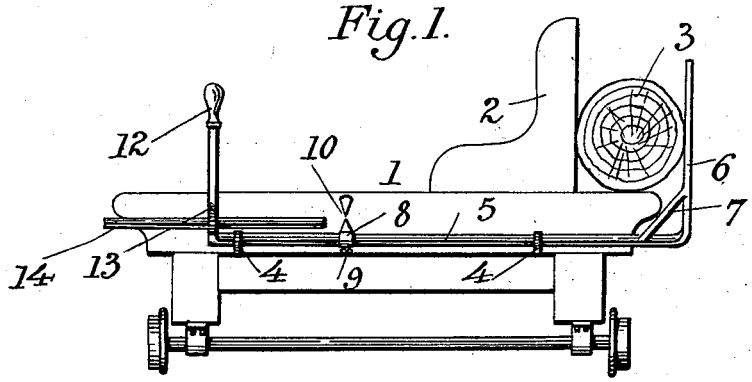
Figure 2:
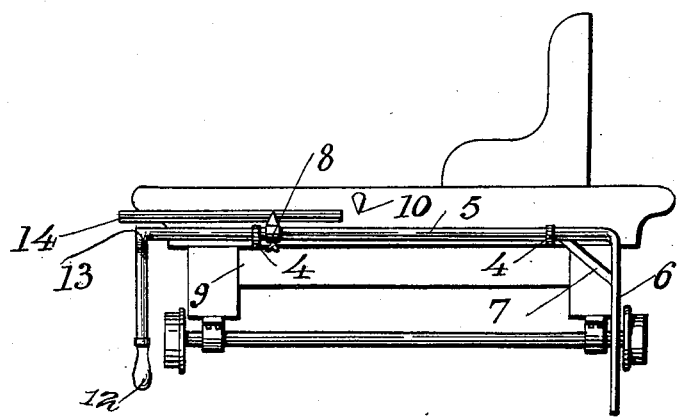

Figure 1 is a front elevation of a sawmill-carriage, showing my improved slab gage or indicator in use. Fig. 2 is a similar view showing the gage or indicator thrown out of the way to permit the log to be rolled on the carriage.

1 represents the carriage-bed, 2 the head-block, and 3 the log.

4 4 represent eyebolts fixed to the carriage-bed to form guides for the transverse rod 5 to slide in. The outer end of said rod 5 terminates in a right-angular gage-arm 6, and 7 represents a diagonal brace connecting said arm and rod to maintain the rigidity of the arm when in contact with the log.

8 represents a pointer adjustably secured on the rod 5 by the thumb-screw 9, and 10 represents a stationary pointer fixed on the carriage.

12 represents a hand-lever fixed to the inner end of the rod 5, and it is provided with an offset or clamp 13, which loosely encompasses the fixed guide-rod 14, along which it freely slides and at the same time supports the arm 6 in a vertical position when it is being moved outwardly by the action of the log being adjusted by the head-block.

I am aware that numerous forms of gages have been adjusted to the back of the log to gage the thickness of the planks to be cut from said log, and such I do not claim; but so far as I am aware I am the first to apply a gage to the face of the log for the purpose of gaging the thickness of the slab.

Although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim as new and useful, and desire to secure by Letters Patent of the United States, is—

A slab indicator or gage for sawmill-carriages, comprising the carriage-bed, the pointer 10, guide-eyes 4 4 and the guide-rod 14, fixed to said bed in combination with the transverse sliding rod 5, having a longitudinal and a rotary movement in said guide-eyes and provided at its outer end with the gage-arm 6 and at its inner end with the lever-handle 12, formed with the clamp-offset 13, and the pointer 8, adjustably secured on the rod 5, substantially as and for the purpose set forth.

In testimony whereof I hereunto affix my signature in presence of two witnesses.

GEO. GLASS.

Witnesses:
   E. S. POST,
   A. D. BENNETT.